US009310737B2

(12) United States Patent
Kojima

(10) Patent No.: US 9,310,737 B2

(45) Date of Patent: Apr. 12, 2016

(54) IMAGE INSPECTION OF PRINTED MATTER WITH A MASTER IMAGE

(71) Applicant: Keiji Kojima, Kanagawa (JP)

(72) Inventor: Keiji Kojima, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 14/468,263

(22) Filed: Aug. 25, 2014

(65) Prior Publication Data

US 2015/0063889 A1 Mar. 5, 2015

(30) Foreign Application Priority Data

Aug. 27, 2013 (JP) ................................. 2013175826
Aug. 11, 2014 (JP) ................................. 2014163530

(51) Int. Cl.
*G06K 15/00* (2006.01)
*H04N 1/00* (2006.01)
*G03G 15/36* (2006.01)

(52) U.S. Cl.
CPC ..................................... *G03G 15/36* (2013.01)

(58) Field of Classification Search
CPC .................... G03G 2215/00569; G03G 15/36; H04N 1/3878; H04N 1/4092; H04N 2201/005; H04N 2201/0095; H04N 2201/00045; H04N 1/444; H04N 1/00002; H04N 1/00013; H04N 1/38; H04N 1/4072; B41J 29/393; B41J 2/2135; G06K 15/1868; G06K 9/03; G06K 9/46; G06K 9/4652; G06K 9/6202
USPC ................................................ 358/1.18, 405
See application file for complete search history.

(56) References Cited

U.S. PATENT DOCUMENTS

2006/0285134 A1* 12/2006 Viturro ................ H04N 1/4015 358/1.9
2013/0016374 A1 1/2013 Kawamoto et al.
2013/0044342 A1 2/2013 Kaneko et al.
2013/0044347 A1 2/2013 Kitai et al.

(Continued)

FOREIGN PATENT DOCUMENTS

JP 03-281276 12/1991
JP 11-78183 3/1999

(Continued)

OTHER PUBLICATIONS

English Machine Translation of JP 2005-028832-A (Imoto, Published Mar. 2, 2005).*

*Primary Examiner* — Benny Q Tieu
*Assistant Examiner* — Juan M Guillermety
(74) *Attorney, Agent, or Firm* — Duft Bornsen & Fettig LLP

(57) ABSTRACT

An image inspection apparatus includes a first-image obtaining unit, a scanned-image obtaining unit, a second-image obtaining unit, first and second registration units, a combining unit, and an inspection unit. The first-image obtaining unit obtains a first image generated by scanning a sheet on which a predetermined image has been printed. The scanned-image obtaining unit obtains a scanned image generated by scanning a printed matter produced by printing a second image additionally on the sheet. The second-image obtaining unit obtains the second image. The first registration unit performs registration between the first and scanned images. The second registration unit performs registration between the second image and the scanned image. The combining unit generates a master image by combining the first and second images based on registration results performed by the first and second registration units. The inspection unit inspects the printed matter by comparing the scanned image against the master image.

8 Claims, 9 Drawing Sheets

(56) References Cited

U.S. PATENT DOCUMENTS

2013/0235396 A1* 9/2013 Hyoki ...................... H04N 1/38
358/1.9
2013/0250319 A1 9/2013 Kaneko et al.
2013/0301083 A1* 11/2013 Kaneda .............. H04N 1/00005
358/406
2014/0226189 A1 8/2014 Kojima et al.

FOREIGN PATENT DOCUMENTS

JP 2005-41122 2/2005
JP 2007-181992 7/2007
JP 2010-149289 7/2010

* cited by examiner

IMAGE INSPECTION OF PRINTED MATTER WITH A MASTER IMAGE

CROSS-REFERENCE TO RELATED APPLICATIONS

The present application claims priority to and incorporates by reference the entire contents of Japanese Patent Application No. 2013-175826 filed in Japan on Aug. 27, 2013 and Japanese Patent Application No. 2014-163530 filed in Japan on Aug. 11, 2014.

BACKGROUND OF THE INVENTION

1. Field of the Invention

The present invention relates to an image inspection apparatus, an image forming apparatus, and image inspection method.

2. Description of the Related Art

In recent years, inspection apparatuses configured to perform inspection of printed matters, which has conventionally been performed manually, have come into use. Such an inspection apparatus typically determines whether a printed matter, which is an inspection subject, has a defect by the following method. A master image to be used as a reference image is generated by scanning an image of a desired quality manually selected from images of printed matters. A portion of the printed matter is compared against a corresponding portion of the master image to determine a magnitude of difference therebetween. Whether the printed matter has a defect is determined based on the magnitude of the difference.

However, plateless printers such as electrophotographic printers which are coming into widespread use in recent years are mainly used to print a small number of copies or in variable printing, in which contents to be printed vary from one page to another. Accordingly, it is inefficient to generate master images from printed matters produced by a plateless printer, unlike cases of offset printers. To solve this problem, a scheme of generating a master image from a print target image (print data) can be employed. This scheme allows efficient inspection of printed matters produced by variable printing.

When an image is formed on a white sheet of paper (hereinafter, “sheet”), inspection can be performed by making comparison between such a master image as that described above and a scanned image obtained by scanning the image formed on the sheet. Meanwhile, in a case where a printing way (hereinafter, sometimes referred to as “preprint printing”) of printing a print target image on a preprinted sheet where a predetermined preprint image such as a line frame or a template document is printed is adopted, appropriate inspection cannot be achieved only by such simple comparison as that described above. This is because, in preprint printing, while the scanned image contains the preprint image and the print target image, a master image generated from the print target image contains only the print target image but does not contain the preprint image.

An example of an image inspection method for such preprint printing is disclosed in Japanese Laid-open Patent Publication No. 3-281276. According to this method, a master image containing a preprint image and a print target image is generated by combining the preprint image and the print target image, and comparison is made using the master image. Another example method is disclosed in Japanese Laid-open Patent Publication No. 11-78183. According to this method, a masked scanned image containing only a print target image is generated by masking a portion corresponding to a preprint image on a scanned image, and comparison is made against a master image containing only the print target image. Still another example method is disclosed in Japanese Laid-open Patent Publication No. 2005-41122. According to this method, a print target image is inspected by obtaining difference between a scanned image and a preprint image and obtaining difference between the scanned image and the print target image.

When an image is formed by an image forming apparatus configured to form an image on a sheet being conveyed, the image can be out of registration with respect to the sheet or, in other words, what is referred to as “registration shift” can occur. Generally, magnitude of this registration shift is as small as several pixels, which is substantially visually unrecognizable. However, the registration shift of several pixels can affect considerably on a result of the above-described image inspection that is performed based on comparison between corresponding pixels.

Accordingly, there is a need for performing registration between a master image and a scanned image when image inspection is performed by comparing corresponding pixels between the master image and the scanned image. In a case where an image is formed/output on a white sheet, registration can be performed between an entire scanned image and an entire master image.

However, if registration shift should occur in preprint printing, a print target image goes out of registration with respect to a preprint image. In other words, if registration shift should occur, because a master image becomes different from a scanned image in terms of image, the master image will not be coincided with the scanned image only by adjusting positions of the entire images. This makes registration difficult.

The technique disclosed in Japanese Laid-open Patent Publication No. 11-78183 will not pose a problem so long as the preprint image can be masked accurately. However, if a part of the preprint image remains unmasked due to inaccurate masking, this part is erroneously detected as a defect. Furthermore, in a case where the preprint image and the print target image are in considerably close proximity to each other or in a case where the images overlap, the print target image can be partially undesirably masked, resulting in erroneous detection of a defect.

The technique disclosed in Japanese Laid-open Patent Publication No. 2005-41122 has not only a disadvantage similar to the problem of the technique disclosed in Japanese Laid-open Patent Publication No. 11-78183 but also a disadvantage in terms of processing time and apparatus cost. More specifically, because the technique involves multiple difference calculations, processing time is increased due to the calculations. Furthermore, because this technique requires that both a master image for the preprint image and a master image for the print target image be stored and that differential data of multiple versions be stored, the need of increasing an on-board memory in size will arise. The multiple difference calculations may be performed in parallel to reduce processing time. However, in this case, it is necessary to add processing logic therefor.

Therefore, there is a need for an image inspection apparatus, an image forming apparatus, and an image inspection method that are capable of inspecting a printed matter produced by forming an image additionally on a sheet, on which another image has already been formed, accurately with simple structure.

SUMMARY OF THE INVENTION

According to an embodiment, an image inspection apparatus includes a first-image obtaining unit, a scanned-image obtaining unit, a second-image obtaining unit, a first registration unit, a second registration unit, a combining unit, and an inspection unit. The first-image obtaining unit obtains a first image generated by scanning a sheet on which a predetermined image has been printed in advance. The scanned-image obtaining unit obtains a scanned image generated by scanning a printed matter produced by printing a second image additionally on the sheet. The second-image obtaining unit obtains the second image. The first registration unit performs registration between the first image and the scanned image. The second registration unit performs registration between the second image and the scanned image. The combining unit generates a master image by combining the first image and the second image based on a result of the registration performed by the first registration unit and a result of the registration performed by the second registration unit. The inspection unit inspects the printed matter by comparing the scanned image against the master image.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of the present invention are described in detail below with reference to the accompanying drawings. An embodiment describes an image forming system including an image inspection apparatus configured to inspect a printed matter produced by preprint printing or, more specifically, by printing a print target image on a preprinted sheet (an example of "sheet") where a template image (an example of "predetermined image") such as a line frame serving as a template is printed in advance. Although it is assumed that contents of print target images to be printed on preprinted sheets vary for each printing. However, that is not the only possible case.

Figure 1:
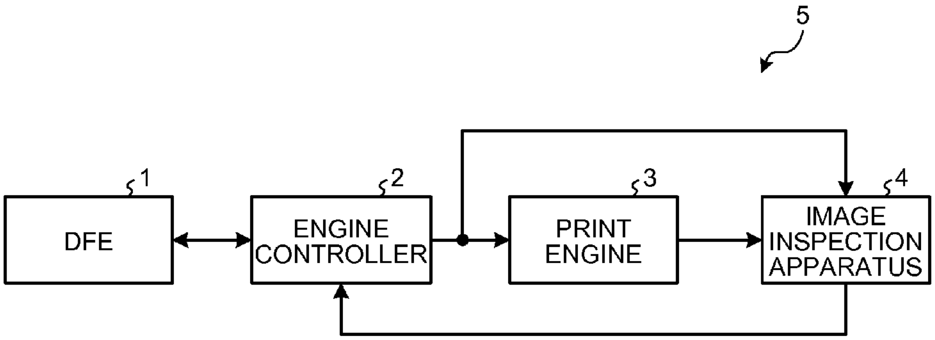
FIG. 1 is a diagram illustrating an example of overall configuration of an image forming system according to an embodiment.

FIG. 1 is a diagram illustrating an example overall configuration of an image forming system 5 according to the embodiment. Referring to FIG. 1, the image forming system 5 according to the embodiment includes a digital front end (DFE) 1, an engine controller 2, a print engine 3, and an image inspection apparatus 4. The DFE 1 generates bitmap data (an example of "second image"; hereinafter, the bitmap data is referred to as "print target image") according to a received print job and outputs the generated bitmap data to the engine controller 2.

The engine controller 2 controls the print engine 3 so as to perform image forming output based on the print target image fed from the DFE 1, and feeds the print target image to the image inspection apparatus 4. The print engine 3 performs image forming output based on the print target image under control of the engine controller 2, thereby producing a printed matter which is a preprinted sheet with the print target image printed thereon. The print engine 3 generates a scanned image by scanning the produced printed matter with a scanning unit (which is omitted from FIG. 1) and feeds the scanned image to the image inspection apparatus 4. The print engine 3 generates, in advance, a preprint image (an example of "first image") by scanning the preprinted sheet where the print target image is not printed yet and feeds the preprint image to the image inspection apparatus 4.

The image inspection apparatus 4 generates a master image for use in inspection of the printed matter, which is produced by the print engine 3, from the print target image and the preprint image fed from the engine controller 2. When generating the master image, the image inspection apparatus 4 according to the embodiment performs registration between the scanned image and the print target image and between the scanned image and the preprint image. This is one of features of the embodiment. The image inspection apparatus 4 inspects the printed matter produced by the print engine 3 by comparing the scanned image fed from the print engine 3 against the master image. The registration may be performed only by calculating a shift amount therebetween, or alternatively, by performing image correction and/or image movement in addition to the calculation of the shift amount.

Figure 2:
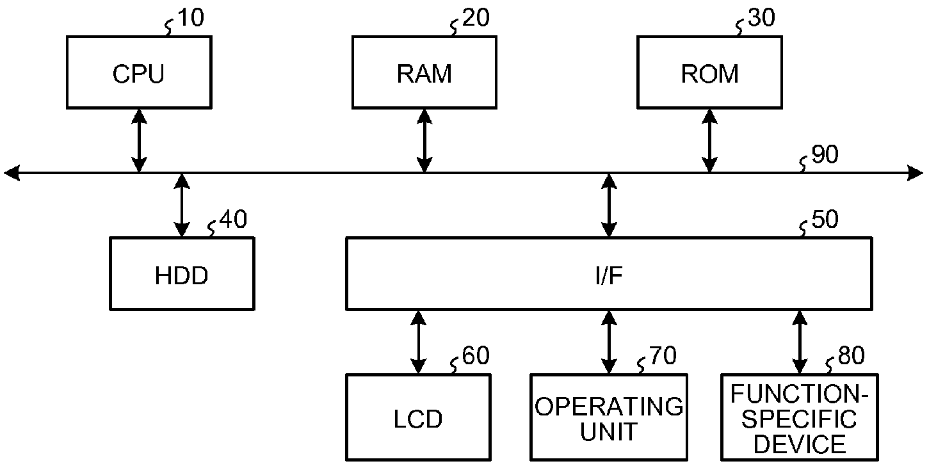
FIG. 2 is a block diagram illustrating an example hardware structure of an image inspection apparatus according to the embodiment.

A structure of hardware which makes up functional blocks of the print engine 3 and those of the image inspection apparatus 4 are described below with reference to FIG. 2. FIG. 2 is a block diagram illustrating an example hardware structure of the image inspection apparatus 4 according to the embodiment. Although FIG. 2 illustrates the hardware structure of the image inspection apparatus 4, the print engine 3 has a similar hardware structure.

As illustrated in FIG. 2, the image inspection apparatus 4 according to the embodiment has a structure similar to those of general information processing apparatuses such as personal computers (PCs) and servers. More specifically, the image inspection apparatus 4 according to the embodiment includes a central processing unit (CPU) 10, a random access memory (RAM) 20, a read only memory (ROM) 30, a hard disk drive (HDD) 40, and an interface (I/F) 50 which are connected via a bus 90. A liquid crystal display (LCD) 60, an operating unit 70, and a function-specific device 80 are connected to the I/F 50.

The CPU 10 is a computing unit which provides overall control of operations of the image inspection apparatus 4. The RAM 20 is a volatile storage medium to and from which high-speed information writing and reading can be done and used as a working area in information processing by the CPU 10. The ROM 30 is a read-only non-volatile storage medium which stores programs such as firmware. The HDD 40 is a non-volatile storage medium to and from which information writing and reading can be done and stores an operating system (OS), various types of control programs, application programs, and the like.

The I/F 50 connects and controls between the bus 90 and various types of hardware, networks, and the like. The LCD 60 is a visual user interface which allows a user to be informed about a state of the image inspection apparatus 4. The operating unit 70 is a user interface which allows a user to input information to the image inspection apparatus 4. Examples of the operating unit 70A include a keyboard and a mouse.

The function-specific device 80 is hardware for implementing a function specific to the print engine 3 or the image inspection apparatus 4. The function-specific device 80 of the print engine 3 may be a plotter apparatus which performs image forming output on a sheet surface or a scanner apparatus which scans an image output on a sheet surface. The function-specific device 80 of the image inspection apparatus 4 may be a processor such as an application specific integrated circuit (ASIC) designed to perform image processing at high speed.

A software control unit is implemented in the above-described hardware structure by loading a program stored in the ROM 30, the HDD 40, or a recording medium such as an optical disk (not shown) into the RAM 20 and executing the program under control of the CPU 10. The functional blocks which implement functions of the print engine 3 (or the image inspection apparatus 4) are implemented by a combination of the software control unit and the hardware.

Figure 3:
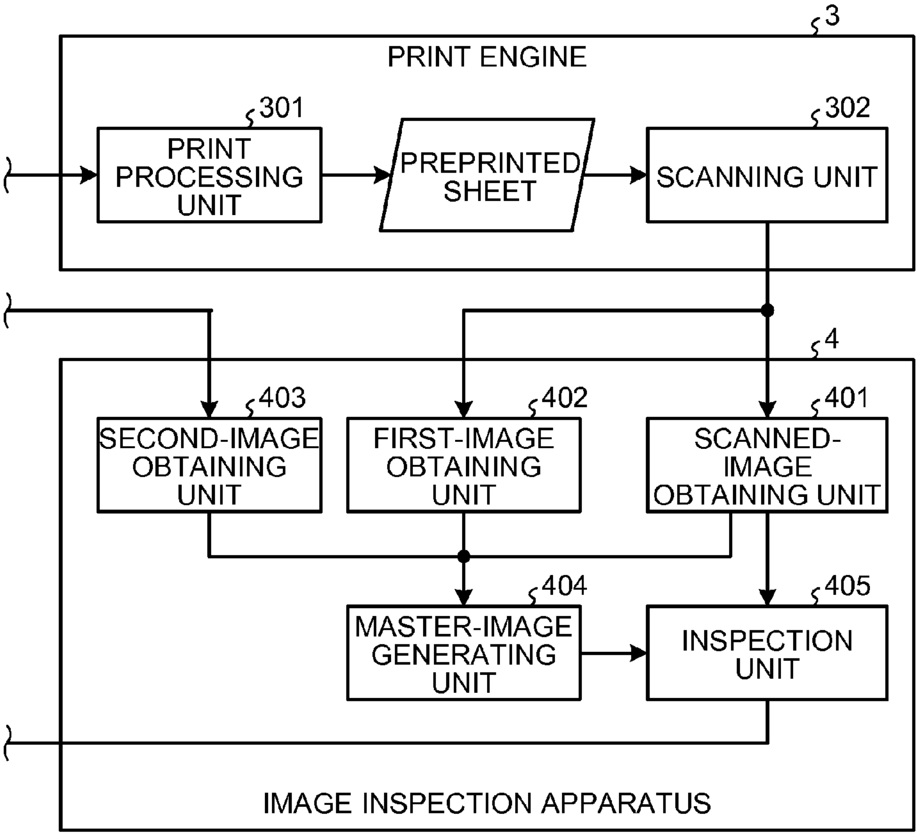
FIG. 3 is a block diagram illustrating an example of a functional structure of a print engine and that of the image inspection apparatus according to the embodiment.

FIG. 3 is a block diagram illustrating an example functional structure of the print engine 3 and that of the image inspection apparatus 4 according to the embodiment. Referring to FIG. 3, the print engine 3 according to the embodiment includes a print processing unit 301 (an example of "image forming unit") and a scanning unit 302 (an example of "image scanning unit"). The image inspection apparatus 4 includes a scanned-image obtaining unit 401, a first-image obtaining unit 402, a second-image obtaining unit 403, a master-image generating unit 404, and an inspection unit 405.

The print processing unit 301 obtains a print target image fed from the engine controller 2, produces a printed matter which is a preprinted sheet with the print target image printed thereon by performing image forming output on the preprinted sheet, and outputs the produced printed matter. The print processing unit 301 according to the embodiment may be implemented in a general electrophotographic image forming mechanism such as a plotter apparatus. The scanning unit 302 generates a scanned image by scanning the printed matter output from the print processing unit 301 and outputs the scanned image to the image inspection apparatus 4. As described above, the scanning unit 302 generates, in advance, a preprint image by scanning the preprinted sheet and outputs the preprint image to the image inspection apparatus 4. In the embodiment, it is assumed that each of the scanned image and the preprint image is a 200-dpi multi-level image represented by pixels with 8 bits per color (red, green, and blue (RGB)) (total 24 bits per pixel), but not limited thereto. The scanning unit 302 according to the embodiment may be implemented in a general electrophotographic image reading mechanism such as a scanner apparatus.

The scanned-image obtaining unit 401, the first-image obtaining unit 402, and the second-image obtaining unit 403 according to the embodiment can be implemented as software described above, for example. The master-image generating unit 404 according to the embodiment can be implemented as the hardware described above, for example. The inspection unit 405 according to the embodiment can be implemented as the software and the hardware described above. For example, the master-image generating unit 404 can be implemented in an ASIC designed to generate master images. The inspection unit 405 can be implemented as the software described above and an ASIC designed to perform image inspection.

The scanned-image obtaining unit 401 obtains the scanned image from the print engine 3 and feeds the scanned image to the master-image generating unit 404 and to the inspection unit 405. The first-image obtaining unit 402 obtains the preprint image from the print engine 3 and feeds the preprint image to the master-image generating unit 404. The second-image obtaining unit 403 obtains the print target image from the engine controller 2 and feeds the print target image to the master-image generating unit 404.

The master-image generating unit 404 generates a master image by combining the preprint image fed from the first-image obtaining unit 402 and the print target image fed from the second-image obtaining unit 403 and feeds the master image to the inspection unit 405. When generating the master image, the master-image generating unit 404 performs registration between the scanned image fed from the scanned-image obtaining unit 401 and the preprint image and registration between the scanned image and the print target image before combining the preprint image and the print target image. The master-image generating unit 404 will be described in detail later.

The inspection unit 405 inspects the printed matter produced by the print engine 3 by comparing the scanned image fed from the scanned-image obtaining unit 401 against the master image fed from the master-image generating unit 404. In the embodiment, it is assumed that, as is the scanned image, the master image is a 200-dpi multi-level image represented by pixels with 8 bits per color (RGB) (total 24 bits per pixel), but not limited thereto.

The inspection unit 405 compares between the scanned image and the master image for each of corresponding pairs of pixels, and calculates a value of difference of pixel values (8 bits per color (RGB)) between each pair of the corresponding pixels. The inspection unit 405 performs inspection as to whether the printed matter produced by the print engine 3 conforms to a preset quality level by determining presence or absence of a defect in the scanned image based on whether or not the calculated difference value exceeds a threshold.

Figure 4:
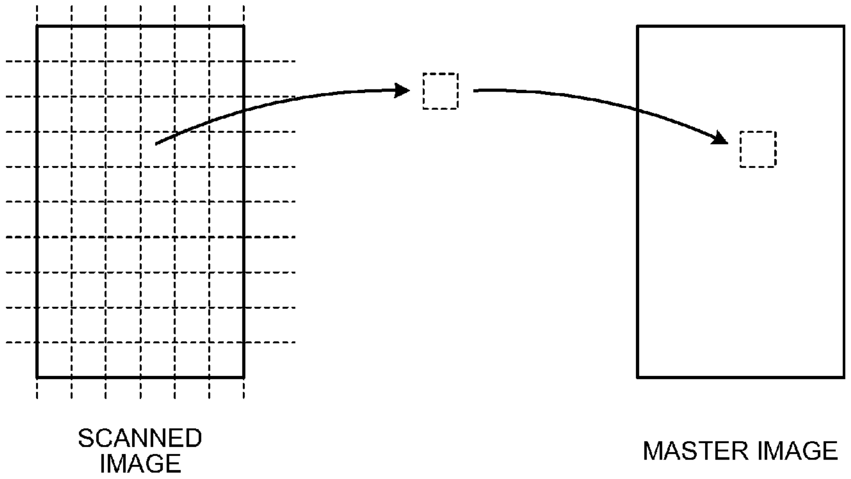
FIG. 4 is a diagram illustrating an example implementation of comparison-based inspection according to the embodiment.

Comparison between the scanned image and the master image is performed as follows. The inspection unit 405 superimposes a divided scanned image obtained by dividing a scanned image for each predetermined area, on a portion on the master image corresponding to the divided area as illustrated in FIG. 4, and calculates difference of pixel values or, in other words, difference in density, for each pixel in the predetermined area. A position where the calculated difference value is minimized is determined by repeatedly performing the calculation step while vertically or horizontally shifting the divided area superimposed on the master image each step, and the thus-determined position is determined as a correct superimposition position. The difference value obtained at this position is adopted as a comparison result.

Difference values between the scanned image and the master image having undergone the registration described above are calculated in this manner. Because the difference values are calculated in the unit of the predetermined divided areas of the scanned image, rather than from the entire scanned image superimposed on the master image, computational complexity in its entirety can be reduced. Furthermore, even if a scaling factor of the entire scanned image differs from that of the entire master image, influence of the difference in scaling factor can be reduced by performing registration on a per-divided-area basis as illustrated in FIG. 4.

As a method for determining whether the difference value exceeds the threshold, the inspection unit 405 employs a method of making comparison between the difference value calculated for each of the pixels and the preset threshold. The inspection unit 405 obtains, as a result of the comparison, information indicating, on the per-pixel basis, whether the difference between the master image and the scanned image has exceeded the preset threshold. Accordingly, inspection as to whether or not a pixel is defective can be performed for each of the pixels making up the scanned image. The size of each of the predetermined areas, into which the scanned image is divided, illustrated in FIG. 4 is desirably determined based on an area where the inspection unit 405 implemented in the ASIC as described above can make the comparison between pixel values at a time.

Figure 5:
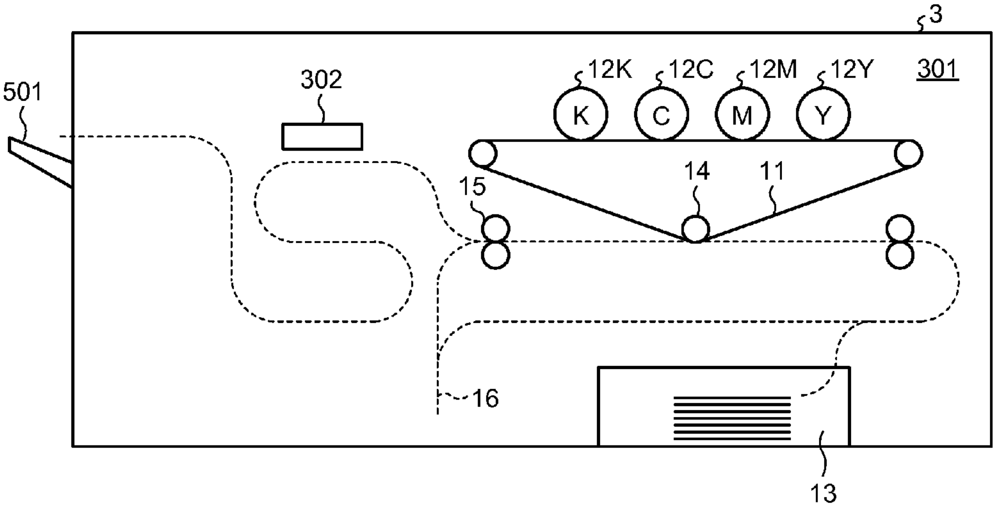
FIG. 5 is a diagram illustrating an example mechanical structure of the print engine according to the embodiment.

An example mechanical structure of the print engine 3 and an example preprinted-sheet conveying path are described below with reference to FIG. 5. As illustrated in FIG. 5, the print processing unit 301 included in the print engine 3 according to the embodiment has a structure in which photoconductor drums 12Y, 12M, 12C, and 12K (hereinafter, collectively referred to as "photoconductor drums 12") for respective colors are arranged along a conveying belt 11, which is an endless conveying unit. In short, the print processing unit 301 is what is referred to as a tandem system. More specifically, the multiple photoconductor drums 12Y, 12M, 12C, and 12K are arranged along the conveying belt 11, which is an intermediate transfer belt where an intermediate transfer image is to be formed, in this order from upstream of a conveying direction of the conveying belt 11. The intermediate transfer image is formed to be transferred onto a preprinted sheet fed from a sheet feeding tray 13.

Images of the respective colors developed with toner on the surfaces of the photoconductor drums 12 for the respective colors are transferred onto the conveying belt 11 to be overlaid on one another to form a full-color image. The full-color print target image formed on the conveying belt 11 in this manner is transferred onto the preprinted sheet conveyed on the preprinted-sheet conveying path by an action of a transfer roller 14 at a position where distance between the print target image and the path indicated by dashed lines in FIG. 5 is minimized.

The preprinted sheet where the print target image is formed is further conveyed. After the print target image is fixed onto the preprinted sheet by fixing rollers 15, the preprinted sheet is conveyed to the image inspection apparatus 4. In duplex printing, the preprinted sheet with the print target image formed and fixed thereon is conveyed to a turn-upside-down path 16 where the preprinted sheet is turned upside down, and thereafter conveyed to the position where transfer by the transfer roller 14 is performed.

Figure 9:
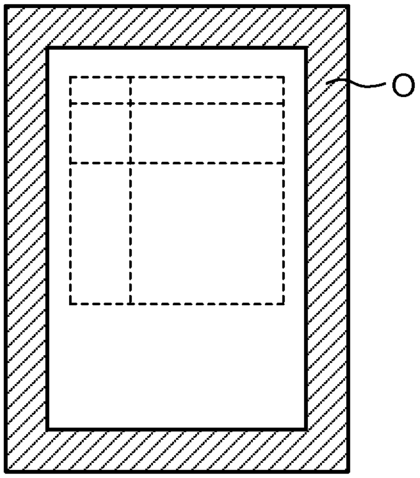
FIG. 9 is a diagram illustrating an example preprint image according to the embodiment.

The scanning unit 302 included in the print engine 3 according to the embodiment generates scanned images by scanning each of surfaces of the preprinted sheet conveyed from the print processing unit 301 on the preprinted-sheet conveying path inside the print engine 3 and outputs the scanned images to the image inspection apparatus 4. The preprinted sheet having undergone scanning of the sheet surfaces by the scanning unit 302 is further conveyed inside the print engine 3 and discharged onto a paper ejection tray 501. Note that FIG. 9 illustrates an example where the scanning unit 302 is provided in the print engine 3 on the preprinted-sheet conveying path only on the side of one surface of the preprinted sheet. Alternatively, the scanning unit 302 may be provided on each side of opposite two surfaces of the preprinted sheet so that the two surfaces of the preprinted sheet can be inspected at a time.

Figure 6:
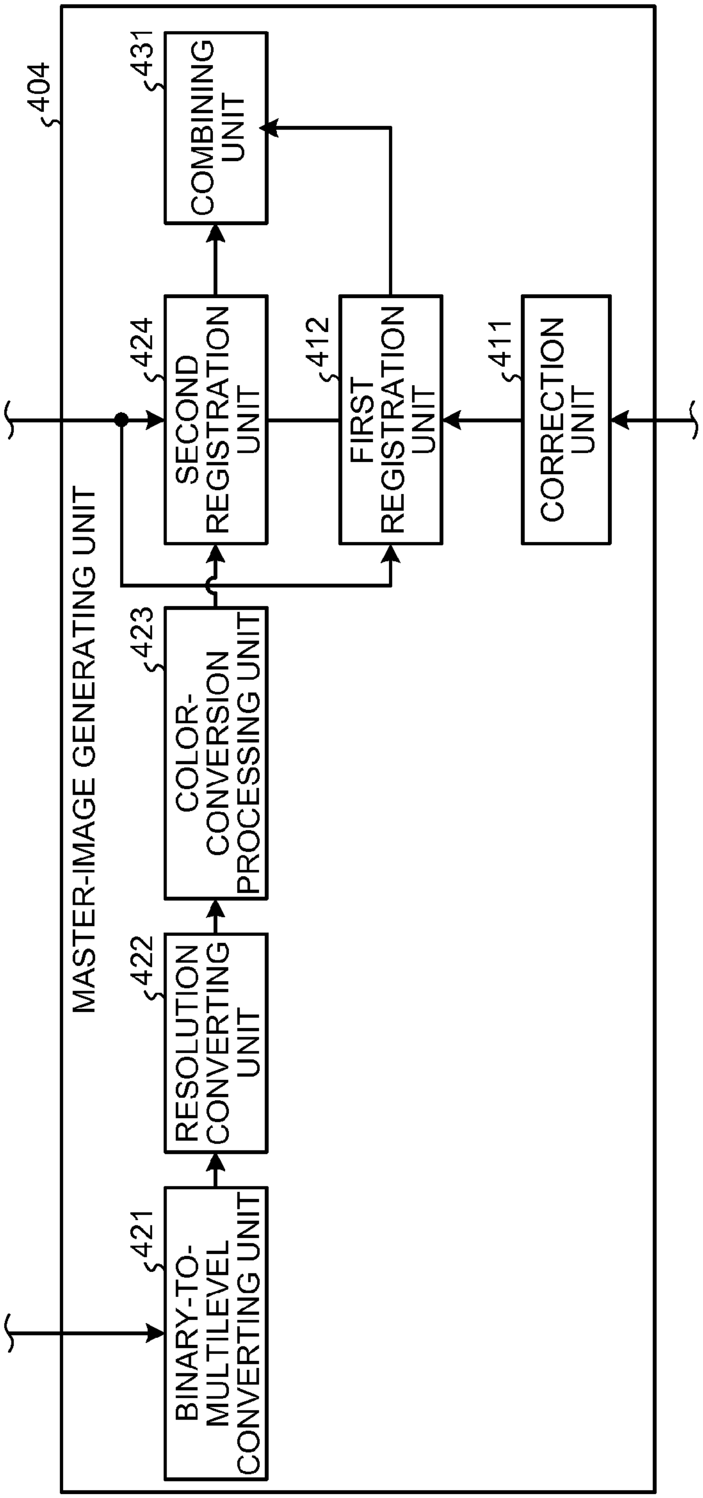
FIG. 6 is a block diagram illustrating an example internal structure of a master-image generating unit according to the embodiment.

Functions included in the master-image generating unit 404 are described in detail below with reference to FIG. 6. FIG. 6 is a block diagram illustrating an example internal structure of the master-image generating unit 404. Referring to FIG. 6, the master-image generating unit 404 includes a correction unit 411, a first registration unit 412, a binary-to-multilevel converting unit 421, a resolution converting unit 422, a color-conversion processing unit 423, a second registration unit 424, and a combining unit 431.

The correction unit 411 corrects each of pixel values of pixels of a no-image region and pixels outside an original-document region (referred to as "an out-of-original-document region") of the preprint image fed from the first-image obtaining unit 402 to their respective ideal values. The first registration unit 412 performs registration between the preprint image (more specifically, the preprint image corrected by the correction unit 411) fed from the first-image obtaining unit 402 and the scanned image fed from the scanned-image obtaining unit 401. As described above, it is assumed that each of the preprint image and the scanned image is a 200-dpi multi-level image represented by pixels with 8 bits per color (RGB) (total 24 bits per pixel).

The binary-to-multilevel converting unit 421 generates a multi-level image from a binary image represented by two values, which represent "color" and "no color" by performing binary-to-multilevel conversion on the binary image. The print target image according to the embodiment is information to be fed to the print engine 3. The print engine 3 performs image forming output based on binary CMYK (cyan, magenta, yellow, and black) images. By contrast, the scanned image according to the embodiment is a multi-level image in which each of red, green, and blue (RGB) is represented by multiple gray levels. Accordingly, the binary-to-multilevel converting unit 421 converts the print target image fed from the second-image obtaining unit 403 from the binary image into a multi-level image. Examples of the multi-level image include an image represented in CMYK, 8 bits per color.

Although the embodiment describes the example configuration in which the print engine 3 performs image forming output based on binary CMYK images, and the binary-to-multilevel converting unit 421 is included in the master-image generating unit 404, this configuration is only an example. More specifically, if it is assumed that the print engine 3 performs image forming output based on multi-level images, the binary-to-multilevel converting unit 421 may be omitted.

The resolution converting unit 422 performs resolution conversion to adjust resolution of the print target image, which is the multi-level image, generated by the binary-to-multilevel converting unit 421 to be equal to resolution of the scanned image. In the embodiment, the scanning unit 302 generates a 200-dpi scanned image. Accordingly, the resolution converting unit 422 converts the resolution of the print target image, which is the multi-level image, generated by the binary-to-multilevel converting unit 421 to 200 dpi.

The color-conversion processing unit 423 performs color conversion of the print target image whose resolution has been converted by the resolution converting unit 422. As described above, the scanned image according to the embodiment is in RGB format. Accordingly, the color-conversion processing unit 423 converts the print target image whose resolution has been converted by the resolution converting unit 422 from CYMK format to RGB format. As a result, a print target image which is a 200-dpi multi-level image represented by pixels with 8 bits per color (RGB) (total 24 bits per pixel) is generated.

The color-conversion processing unit 423 also performs color adjustment to adjust color of the print target image, which is digital data, to be equal to color of the scanned image. This color adjustment is performed by the color-conversion processing unit 423 by converting pixel values of the print target image, which has been converted from CYMK format to RGB format, according to a table where RGB values of the input print target image are associated with RGB values representing colors of a tone-correction scanned image generated by the scanning unit 302.

The table described above or, more specifically, the table where the RGB values of the print target image are associated with the RGB values of the tone-correction scanned image, may be produced as follows, for example. The print processing unit 301 outputs a tone-correction image containing color patches of various colors each represented by pixel values (hereinafter, "color-patch pixel values") on a sheet. The scanning unit 302 generates the tone-correction scanned image by scanning the surface of the sheet where the tone-correction image is formed. Pixel values of the tone-correction scanned image at positions corresponding to the color patches are respectively associated with the color-patch pixel values into tabular representation.

Such a color-patch-based table as that described above is preferably produced at start of, for example, a single print job. Producing the table at start of a print job allows a print condition and a scan condition of the print job to be incorporated in the table. Meanwhile, the tone-correction scanned image contains a no-image portion where no patch is present. Pixel values of the no-image portion of the tone-correction scanned image are used in no-image-region detection, which will be described later.

The second registration unit 424 performs registration between the print target image fed from the second-image obtaining unit 403 (more specifically, the print target image output from the color-conversion processing unit 423) and the scanned image fed from the scanned-image obtaining unit 401. As described above, the scanned image is a 200-dpi multi-level image represented by pixels with 8 bits per color (RGB) (total 24 bits per pixel). The print target image at this stage is also a 200-dpi multi-level image represented by pixels with 8 bits per color (RGB) (total 24 bits per pixel).

The combining unit 431, which pertains to a feature of the embodiment, generates a master image by combining the preprint image fed from the first-image obtaining unit 402 and the print target image fed from the second-image obtaining unit 403. As described above, the preprint image is a 200-dpi multi-level image represented by pixels with 8 bits per color (RGB) (total 24 bits per pixel). The print target image at this stage is also a 200-dpi multi-level image represented by pixels with 8 bits per color (RGB) (total 24 bits per pixel). Accordingly, the master image is also a 200-dpi multi-level image represented by pixels with 8 bits per color (RGB) (total 24 bits per pixel) as described above.

Figure 7:
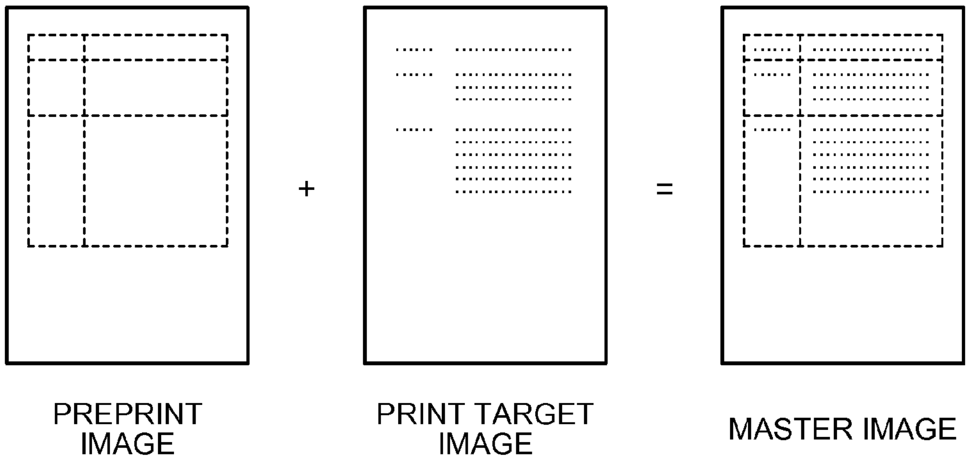
FIG. 7 is a diagram illustrating an example implementation of generating a master image according to the embodiment.

As illustrated in FIG. 7, each of the print target image and the preprint image contains a blank portion and a portion where a graphic object, such as a character or a line frame, is present. The master image contains both the preprint image and the print target image. The same applies to an image obtained by printing a print target image on a preprinted sheet.

However, generally, when an image is formed by an image forming apparatus configured to form an image on a sheet being conveyed, the image can be out of registration with respect to the sheet or, in other words, what is referred to as "registration shift" can occur. Generally, magnitude of this registration shift is as small as several pixels, which is substantially visually unrecognizable. However, the registration shift of several pixels can affect considerably on a result of inspection that is performed based on comparison between pixel values of pixels.

This will be described more specifically below. Reference relative positions of the preprint image and the print target image are determined after adjusting the sizes of the images to be identical to each other. However, relative positions of the scanned image generated by the scanning unit 302 by scanning the preprinted sheet with the print target image printed thereon and the print target image vary from one page to another due to the registration shift described above.

More specifically, in contrast to the master image generated by combining the preprint image and the print target image in the reference relative positions, relative positions of the preprint image and the print target image in the scanned image vary from one page to another. Accordingly, if inspection is performed by comparing the scanned image against the master image generated by combining the preprint image and the print target image in the reference relative positions, the inspection will lack in accuracy. To solve this problem, the combining unit 431 according to the embodiment generates a master image by combining the preprint image and the print target image based on a result of registration performed by the first registration unit 412 and a result of registration performed by the second registration unit 424. This is one of features pertaining to the embodiment.

Figure 8:
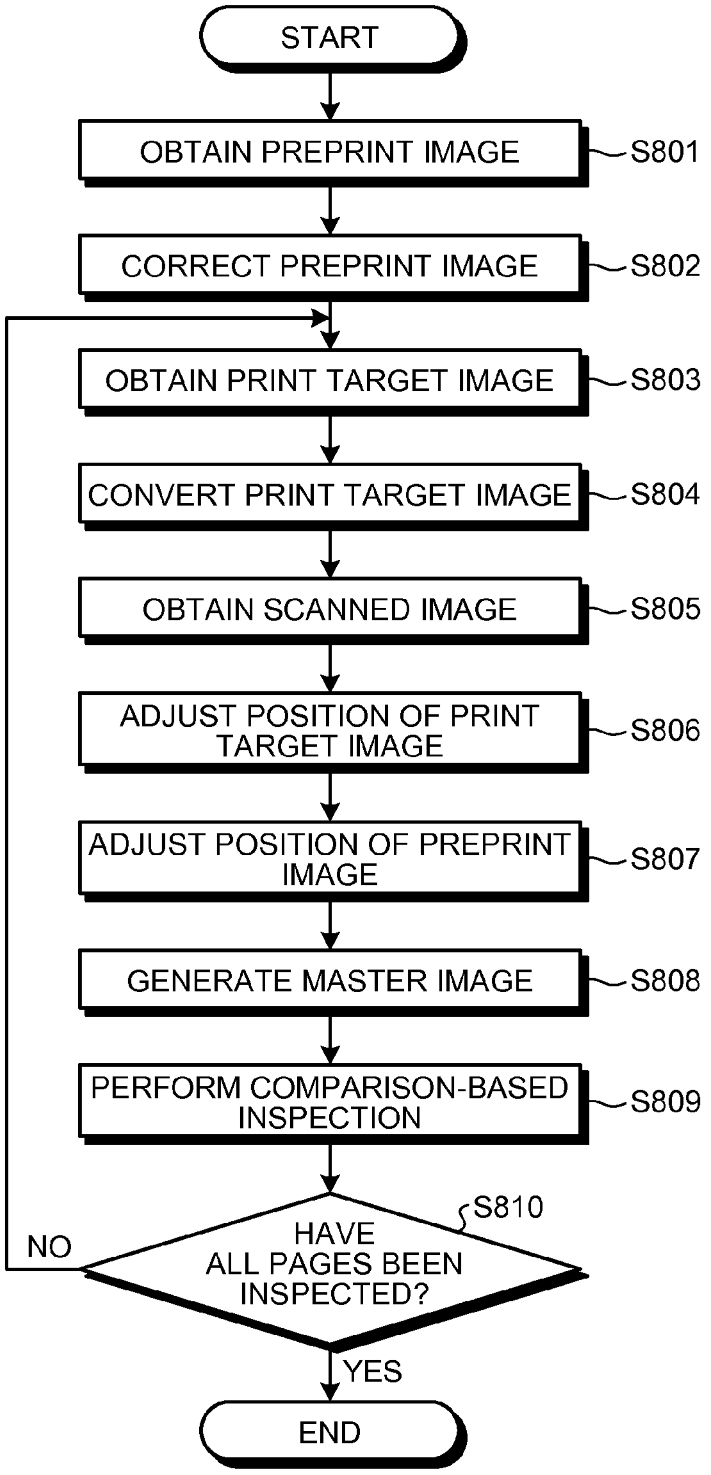
FIG. 8 is a flowchart illustrating an example of operations performed by the image inspection apparatus according to the embodiment.

An example of operations performed by the image inspection apparatus 4 according to the embodiment is described below with reference to FIG. 8. Operations involved in a single job, which is made up of multiple pages and by which print target images which differ from one page to another are printed, are described below with reference to FIG. 8. When a single print job is started, as illustrated in FIG. 8, a preprinted sheet where no print target image is printed yet is conveyed and scanned by the scanning unit 302. The first-image obtaining unit 402 obtains a preprint image (S801).

The first-image obtaining unit 402 feeds the obtained preprint image to the master-image generating unit 404. The correction unit 411 of the master-image generating unit 404 corrects the preprint image (S802). More specifically, the correction unit 411 corrects pixel values of a no-image region and an out-of-original-document region of the preprint image to their respective ideal values at S802.

Correction to an ideal value applied to the no-image region performed at S802 is described below. The preprint image is an image where an object, e.g., borders, is present as illustrated in FIG. 7. Portion other than the object such as borders of the preprint image is a region whose color remains unchanged from the color of the sheet or, in other words, a template image region to which no developer is to be applied in image forming output. Examples of the developer include toner and ink. Meanwhile, because the no-image portion is the region to be used as the master image, pixel values of the no-image portion of the preprint image are desirably the ideal value (an example of "first predetermined value"). However, density in the no-image region varies even when the region is scanned with a same scan condition.

To prevent this variation, at S802, the correction unit 411 detects a no-image portion other than the portion where the preprint image such as borders is present and replaces pixel values of the no-image portion with the preset ideal value. The correction unit 411 detects the no-image portion by comparing a pixel value of each pixel belonging to the preprint image against a threshold having been set for the no-image-region detection.

Note that the image inspection apparatus 4 according to the embodiment produces the table for use by the color-conversion processing unit 423 in color conversion in advance of performing the operation flow illustrated in FIG. 8. The tone-correction scanned image obtained in the process of producing the table contains the no-image region as described above. Accordingly, the correction unit 411 can perform no-image-region detection on the preprint image by using the pixel value of the no-image region.

More specifically, the no-image-region detection can be performed by setting a tone range whose center is at the pixel value of the no-image region contained in the tone-correction scanned image as a no-image-region detection range, and setting an upper limit value and a lower limit value of this range as thresholds, for example. Implementation of setting only a lower-limit RGB value as the threshold is applicable to a case where the color of the no-image region is white or a like light color. Similarly, implementation by setting only an upper-limit RGB value as the threshold is applicable to a case where the color of the no-image region is a dark color close to black. As the ideal value to which the pixel values of the detected no-image region are to be converted, the pixel value of the no-image region contained in the tone-correction scanned image may preferably be used.

Correction to an ideal value applied to an out-of-original-document region is described below. FIG. 9 is a diagram illustrating an example preprint image obtained by the master-image generating unit 404 at S802. The scanning unit 302 scans a printed sheet output from the print processing unit 301 in a manner to scan an original-document region inclusive of a margin area outside of the original-document region to prevent an undesirable situation that an end portion of the original-document region is unintentionally omitted from a resultant scanned image or the like. This scan manner yields a scan result of the preprint image containing an out-of-original-document region O (an example of "out-of-predetermined-image portion") which is the margin portion as illustrated in FIG. 9. The color of the out-of-original-document region O is the color of the conveying belt which conveys the printed sheet in a range where the scanning unit 302 performs scanning. A dark color such as black is typically used as the color of the conveying belt to prevent an undesirable situation that an image on the backside of the printed sheet is unintentionally contained in the scanned image.

The image inspection apparatus 4 detects the out-of-original-document region O, thereby detecting an end portion of the original-document region and limiting a target range of comparison-based inspection only to the original-document region. Accordingly, to facilitate detection in subsequent operations, pixel value of the out-of-original-document region O is desirably changed to a special value (an example of "second predetermined value") rather than unchanged from the pixel value obtained by the scanning unit 302 by scanning. The special value can be, for example, a value of which RGB component values are all zero.

Accordingly, at S802, the correction unit 411 obtains pixel values in a predetermined area of a marginal frame portion of the obtained preprint image, detects a portion where RGB values are close to black and fall within a predetermined gray level range as the out-of-original-document region O, and corrects the pixel values to a value of which RGB values are all zero, for example. By performing correction as such, the correction unit 411 holds the preprint image containing the no-image region to which the correction to the ideal value is applied and the out-of-original-document region to which the correction to the ideal value is applied by storing the preprint image in a storage medium.

Subsequently, the print job is executed, and the engine controller 2 outputs each of the print target images of the pages which are to be output. As described above, the print target image is fed not only to the print engine 3 so that the print target image is printed by the print processing unit 301 but also to the image inspection apparatus 4 so that a master image is generated. Accordingly, the second-image obtaining unit 403 obtains the print target image, and feeds the print target image to the master-image generating unit 404 (S803).

Subsequently, the master-image generating unit 404 performs the conversion described above with reference to FIG. 6, thereby converting the print target image to a 200-dpi multi-level image represented by pixels with 8 bits per color (RGB) (total 24 bits per pixel) (S804).

Subsequently, the print processing unit 301 produces a printed matter by performing image forming output of the print target image fed to the print engine 3 on a preprinted sheet. The scanning unit 302 generates a scanned image by scanning the produced printed matter. The scanned-image obtaining unit 401 obtains the scanned image and feeds the scanned image to the master-image generating unit 404 and to the inspection unit 405 (S805).

Figure 10:
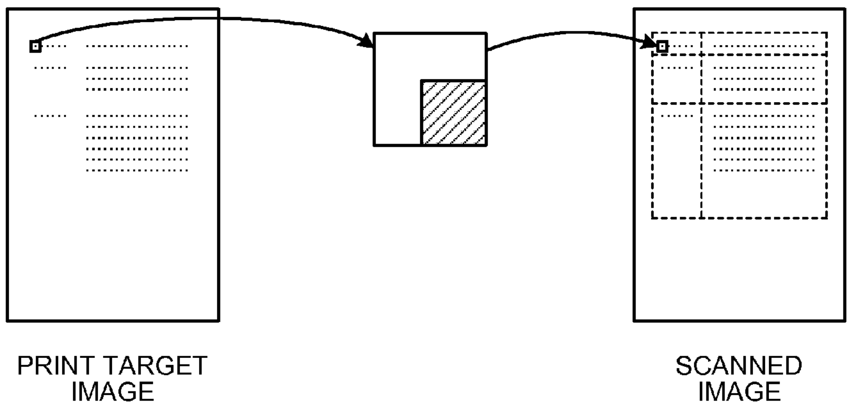
FIG. 10 is a diagram illustrating an example implementation of performing registration between a print target image and a scanned image according to the embodiment.

Subsequently, the second registration unit 424 performs position adjustment of the print target image converted to the 200-dpi multi-level image represented by pixels with 8 bits per color (RGB) (total 24 bits per pixel) by making per-pixel comparison between the print target image and the scanned image (S806). FIG. 10 is a diagram illustrating position adjustment of the print target image performed at S806. As illustrated in FIG. 10, at S806, the second registration unit 424 superimposes a reference image (an example of "second reference image") in a predetermined area containing a reference point (an example of "second reference point") of the print target image on the scanned image and calculates difference between each pair of pixels through an operation similar to that described above with reference to FIG. 10. Put another way, the second registration unit 424 performs registration between the print target image and the scanned image by performing registration between the reference image and a portion, which matches with the reference image, of the scanned image.

In the example illustrated in FIG. 10, a most top left point of edge points extracted from the print target image is used as the reference point of the print target image. Such edge point extraction can be implemented by using a known technique such as an edge detection filter.

Implementation for extracting the reference point of the print target image is not limited to that by edge point extraction described above; alternatively, the reference point may be manually designated by an operator. In a case where an image serving as a registration reference, e.g., what is referred to as a registration mark, is contained in the print target image, an intersection of the registration mark may alternatively be used as the reference point. A region of several horizontal by several vertical pixels whose center is at the reference point determined in this manner is used as the predetermined area described above.

The predetermined area can be, for example, a rectangular area of 10 horizontal by 21 vertical pixels whose center is at an edge point. In FIG. 10, a region which is within the predetermined area and where the print target region is present is shown as a hatched region.

The second registration unit 424 repeatedly performs this step while vertically or horizontally shifting the superimposition area each step. The area to be vertically or horizontally shifted can be, for example, an area of 15 horizontal by 15 vertical pixels whose center is at a reference superimposition position.

The second registration unit 424 determines a position where the calculated difference value is minimized as a correct superimposition position and obtains an amount of vertical gap and an amount of horizontal gap with respect to the correct position as a registration result. The second registration unit 424 obtains the amount of registration shift between the preprint image and the scanned image as coordinate information which can be, for example, $(X_{gap\text{-}pre}, Y_{gap\text{-}pre})$ where $X_{gap\text{-}pre}$ is the amount of horizontal gap and $Y_{gap\text{-}pre}$ is the amount of vertical gap, and feeds the registration shift amount and the print target image to the combining unit 431. This coordinate information is a value indicating a pixel position on the scanned image.

Figure 11:
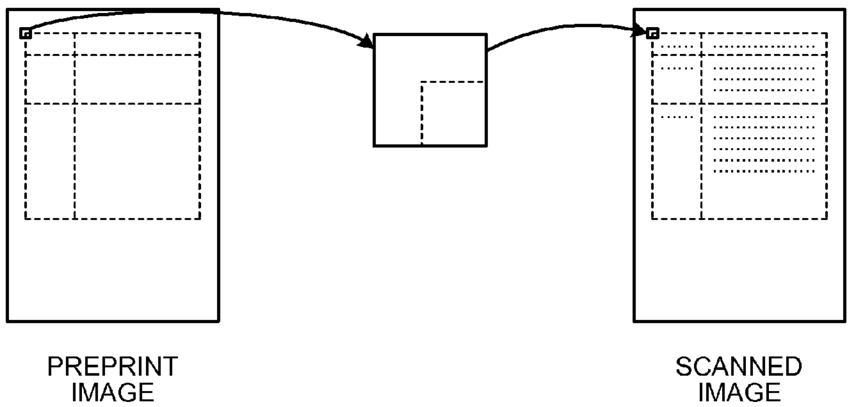
FIG. 11 is a diagram illustrating an example implementation of performing registration between a preprint image and the scanned image according to the embodiment.

The first registration unit 412 performs position adjustment of the preprint image by comparing the scanned image fed to the first registration unit 412 and the preprint image corrected by the correction unit 411 (S807). FIG. 11 is a diagram illustrating position adjustment of the preprint image performed at S807. As illustrated in FIG. 11, also at S807, the first registration unit 412 performs an operation similar to that performed at S806 on the preprint image and the scanned image, thereby obtaining an amount of registration shift between the preprint image and the scanned image as coordinate information which can be, for example, $(X_{gap\text{-}var}, Y_{gap\text{-}var})$, and feeds the registration shift amount and the preprint image to the combining unit 431.

Subsequently, upon obtaining the registration shift amount between the print target image and the scanned image and the registration shift amount between the preprint image and the scanned image through the operations of S806 and S807, the combining unit 431 performs registration between the print target image and the preprint image based on the obtained registration shift amounts. Thereafter, the combining unit 431 generates a master image by combining the print target image and the preprint image (after correcting the positions of the print target image and the preprint image, respectively) as illustrated in FIG. 7 (S808).

More specifically, at S808, the combining unit 431 performs registration by relatively moving the print target image and the preprint image or, more specifically, moving the print target image and the preprint image parallel to each other, using $(X_{gap\text{-}pre}, Y_{gap\text{-}pre})$ and $(X_{gap\text{-}var}, Y_{gap\text{-}var})$ obtained in the manner described above, and thereafter combines the print target image the preprint image. The operations described above yield the master image generated by combining the print target image and the preprint image, which depend on the relative positions of the print target image in the print target image and the preprint image.

At S808, the combining unit 431 performs the combining by superimposing only a to-be-printed portion or, in other words, exclusive of a no-image portion, of such a print target image as that illustrated in FIG. 7 on the preprint image. Put another way, the combining unit 431 superimposes, of pixels making up the print target image, only pixels corresponding to the portion where developer is to be applied on a sheet in image forming output on the preprint image.

Such an operation as that described above can be implemented as follows, for example. Whether or not a pixel value of each pixel making up the print target image falls within the threshold range of the pixel values having been set for the no-image-region detection is determined. If the pixel value falls within the threshold range, the pixel is determined as belonging to the no-image region and excluded from pixels to be superimposed on the preprint image (hereinafter, "superimposition subject on the preprint image"). If the pixel value falls out of the threshold range, the pixel is determined as belonging to the to-be-printed region such as a character and included in the superimposition subject on the preprint image.

No-image-region detection using thresholds similar to those described above may be performed in each of the conversions described above with reference to FIG. 6 performed by the binary-to-multilevel converting unit 421, the resolution converting unit 422, and the color-conversion processing unit 423, respectively, on the print target image. For a pixel determined as belonging to a no-image region, a flag indicating that the pixel belongs to a no-image region may be set. Each of the binary-to-multilevel converting unit 421, the resolution converting unit 422, and the color-conversion processing unit 423 performs the corresponding conversion based on pixel values of individual pixels. Accordingly, processing efficiency can be increased by performing the threshold-based no-image-region detection described above in the conversion.

The flag described above allows the combining unit 431 to determine whether or not to include the pixel in the superimposition subject on the preprint image only based on the flag and obviates the need of making the threshold-based determination at the combining at S808. Consequently, processing load can be reduced, and time necessary for the combining can be reduced.

Superimposing the superimposition subject or, in other words, the to-be-printed region determined as not being a no-image region, on the preprint image can be performed only by simply overwriting, with pixel values of the print target images, pixel values of corresponding pixels of the preprint image. Alternatively, a scheme of selecting a darker one or, more specifically, a value representing a color closer to black, of a pixel value of the print target image and a pixel value of the preprint value may be employed. Determination as to which pixel value represents a color closer to black can be made by, for example, comparing totals of RGB component values.

Examples of the thresholds for use in the no-image-region detection include pixel values of the no-image region contained in the tone-correction scanned image obtained in the process, which is performed in advance of the operations illustrated in FIG. 8, of producing the table for use by the color-conversion processing unit 423 in color conversion. More specifically, the thresholds may be set as follows in a manner similar to that described above. A tone range whose center is at a pixel value of the no-image region of the tone-correction scanned image is set as a no-image-region detection range. An upper-limit value and a lower-limit value of this range are set as the thresholds.

Subsequently, after the master image has been generated, the inspection unit 405 performs comparison-based inspection on the master image and scanned image (S809). In the comparison-based inspection, the inspection unit 405 compares between the master image and the scanned image and outputs a differential image. More specifically, the inspection unit 405 performs subtraction between pixel values of pixels belonging to the master image and pixel values of pixels at corresponding positions of the scanned image, thereby extracting differences.

If image forming output is performed accurately and, furthermore, the registration described above is performed favorably, the differences between the master image and the scanned image are small. In this state, because tone values of pixels making up the images are substantially equal to each other, the result of subtraction is close to zero. However, if image forming output is not performed as intended, the tone values of the pixels differ from each other, causing the result of subtraction not to be close to zero.

The inspection unit 405 makes defect determination by comparing the difference values obtained in this manner against predetermined thresholds. This defect determination may be made by comparing the calculated differences against thresholds which are respectively set for R, G, and B planes. Alternatively, the determination may be made by calculating a value indicating disparity in color in lightness, hue, and chroma in its entirety based on differences on each of the R, G, and B planes and comparing the calculated value against a threshold set for the value. If a difference value(s) obtained as a result of the comparison exceeds the threshold(s), the inspection unit 405 determines that the scanned image has a defect or, put another way, the printed matter from which the scanned image is obtained has a defect.

The comparison-based inspection according to the embodiment uses the master image generated by combining, through the operations of S806 to S808, the print target image and the preprint image based on the relative positions of the scanned image and the print target image and the relative positions of the scanned image and the preprint image. Accordingly, erroneous detection of a defect which may otherwise be caused by difference in the relative positions between the master image and the scanned image with respect to the print target image and the preprint image can be prevented.

The image inspection apparatus 4 repeatedly performs the operations of S803 and the following steps until the inspection is performed on all the pages belonging to the job (No at S810). If the inspection has been performed on all the pages (Yes at S810), the image inspection apparatus 4 brings the operations to an end. The operations performed by the image inspection apparatus 4 according to the embodiment are thus completed.

As described above, when inspecting a printout produced by preprint printing which outputs a print target image, such as a business form, on a preprinted sheet where a preprint image, such as borders or the like, is printed in advance, the image inspection apparatus 4 according to the embodiment generates a master image by combining the print target image and a preprint image.

The master image is generated by combining the print target image and the preprint image on each of which registration with respect to the scanned image has been performed. Accordingly, the print target image and the preprint image on the generated master image are in the same relative positions as those on the scanned image against which the comparison is to be made. As a result, an undesirable situation that comparison-based inspection, which is performed by comparing the master image and the scanned image on a per-pixel basis, is performed inaccurately to result in erroneous detection of a defect due to difference in the relative positions between the master image and the scanned image with respect to the print target image and the preprint image can be prevented.

First Modification

The embodiment has been described by way of the example in which the predetermined area is defined with reference to the reference point, which is the most top left point of the edge points extracted from the print target image, in the registration between the print target image and the scanned image described above with reference to FIG. 10. In this example, the image in the predetermined area extracted from the print target image is an image where only the print target image is present and does not contain the preprint image such as borders. Accordingly, failure in pattern matching can occur in inspection performed based on comparison with the scanned image if an area of the scanned image on which the image of the predetermined area is to be superimposed should contain a preprint image such as borders.

However, occurrence of such a problem can be prevented by, for example, designating a point as far as possible from the preprint image such as borders as the reference point of the scanned image. Designating the reference point in this manner allows preventing the predetermined area from undesirably containing the preprint image such as borders even when pattern matching is performed while shifting the predetermined area vertically or horizontally each step. Accordingly, the second registration unit 424 can solve the problem described above by extracting, from the print target image, an edge point most distant from a nearest point on the preprint image.

Examples of a method for extracting an edge point most distant from a nearest point on the preprint image include the following method. The second registration unit 424 extracts edge points from the print target image using such an edge detection filter. The second registration unit 424 then calculates, for each of the extracted edge points, the shortest distance between a point on the preprint image corresponding to coordinates of the edge point and a preprint image such as a border. The second registration unit 424 adopts an edge point at which the shortest distance calculated in this manner is the longest among the edge points as the reference point.

Although it is typical that the print target image and the preprint image are out of registration, rough estimation of the distance can be achieved through the operation described above. Accordingly, an edge point most distant from the preprint image such as borders among edge points extracted from the print target image can be selected by performing the operation described above.

Second Modification

Also in the registration between the preprint image and the scanned image described above with reference to FIG. 11, when pattern matching is performed by superimposing the predetermined area extracted from the preprint image on the scanned image, an undesirable situation that the predetermined area is undesirably superimposed on the print target image in the scanned image can occur. This undesirable situation can be prevented by selecting, from edge points extracted from the preprint image, an edge point most distant from the print target image such as a character as in the case of the print target image.

Third Modification

FIGS. 10 and 11 illustrate the example implementation in which the top left point is extracted from each of the print target image and the preprint image. Alternatively, the first registration unit 412 may extract six points (an example of "multiple first reference points") as reference points for the registration involved in the inspection performed by the inspection unit 405. The six points may be, for example, in addition to four points at the top left, bottom left, top right, and bottom right, two points on the right and left at a center position in the sub-scanning direction of a page.

The six points are basically extracted from the preprint image. The reason therefor is that the preprint image often contains borders; therefore, points (e.g., intersections of lines) which are favorably employed as the reference points are contained in a page. Alternatively, the following scheme may be employed. The second registration unit 424 extracts six points (an example of "multiple second reference points") from the print target image as well. The inspection unit 405 uses the point(s) extracted from the print target image as a substitute for a point(s) where extraction from the preprint image has failed. The inspection unit 405 performs registration between the scanned image and the master image with reference to the six points extracted from the preprint image or the six points extracted from the print target image, and performs inspection by making per-pixel comparison.

The first registration unit 412 and the second registration unit 424 extract these reference points automatically by default. Accordingly, by performing the registrations with respect to the scanned image illustrated in FIGS. 10 and 11 using any one of the reference points extracted automatically by default, the amount of additional processing necessary to perform the registration between the print target image and the scanned image and registration between the preprint image and the scanned image can be reduced. As a result, efficient processing can be achieved.

Fourth Modification

The embodiment has been described by way of the example in which, as described above with reference to FIGS. 10 and 11, each of the registration between the print target image and the scanned image and the registration between the preprint image and the scanned image is performed by relatively moving the entire image based on registration shift amount which is determined at one point on the image. Alternatively, a configuration in which an amount of registration shift is calculated at multiple points and the entire image is corrected by geometric correction may be employed. Such implementation is described below.

Figure 12:
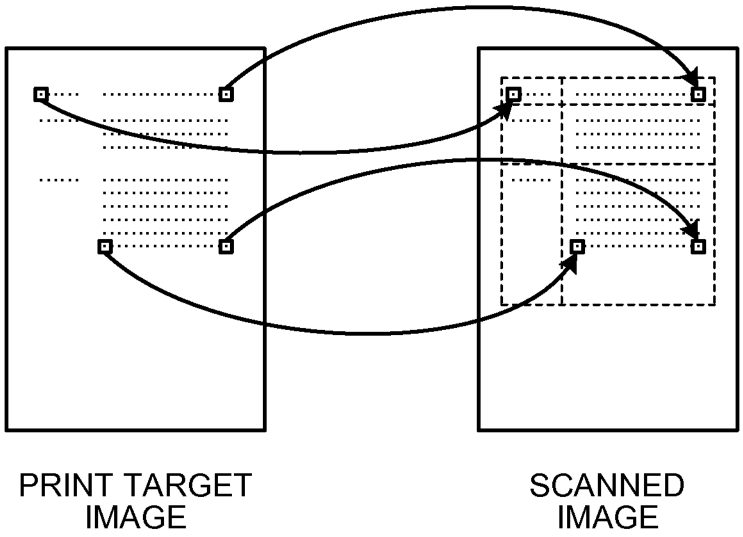
FIG. 12 is a diagram illustrating an example implementation of performing registration between a print target image and a scanned image according to a fourth modification.
Figure 13:
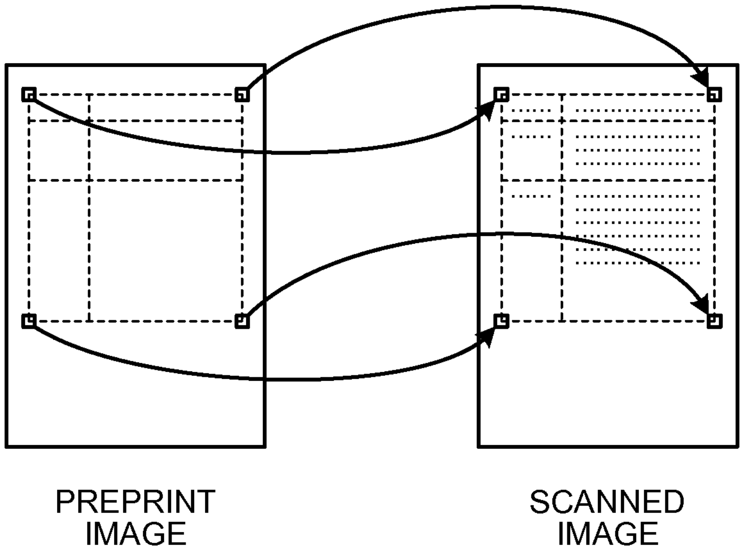
FIG. 13 is a diagram illustrating an example implementation of performing registration between a preprint image and the scanned image according to the fourth modification.

FIG. 12 is a diagram illustrating position adjustment of the print target image according to a fourth modification which includes geometric correction. FIG. 13 is a diagram illustrating position adjustment of the preprint image according to the fourth modification which employs geometric correction. As illustrated in FIGS. 12 and 13, when configured to perform geometric correction, each of the first registration unit 412 and the second registration unit 424 extracts four predetermined areas from the preprint image and the print target image, respectively, performs registration with respect to the scanned image by pattern matching, and obtains positions of each of the four predetermined areas on the scanned image. Each of the four predetermined areas contains a reference point. The combining unit 431 generates a master image by applying geometric correction based on the thus-obtained four positions.

As the geometric correction, projective transformation may be typically performed. Projective transformation is an operation of deforming quadrilaterals in such a manner that points of one quadrilateral are mapped to points of another quadrilateral which is deformed relative to the one quadrilateral. More specifically, by substituting coordinates of center points of each of the four predetermined areas of each of the print target image and the preprint image and coordinates of center points of the four predetermined areas of the scanned image into simultaneous equations expressing the projective transformation, equations (an example of "result of registration performed by a first registration unit 412" and "result of registration performed by a second registration unit 424") for converting the preprint image and the print target image so that the preprint image and the print target image are superimposed on the scanned image can be obtained.

After obtaining the equations for projective transformation in this manner, the combining unit 431 applies deformation mapping to, or corrects, each of the print target image and the preprint image using the projective transformation equation obtained for the print target image and that obtained for the preprint image, respectively, and thereafter combines the corrected print target image and the preprint image at S808 of FIG. 8. By applying correction in this manner, a master image can be generated by combining the preprint image and the print target image which are corrected for error(s) in shape inclusive of shrinkage resulting from printing, rather than corrected only by relative moving.

According to aspects of the present invention, a printed matter obtained by forming an image on a sheet, on which another image has already been printed, can be inspected accurately with simple structure.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image inspection apparatus comprising:

a first-image obtaining unit configured to obtain a first image generated by scanning a sheet on which a predetermined image has been printed in advance;

a scanned-image obtaining unit configured to obtain a scanned image generated by scanning a printed matter produced by printing a second image additionally on the sheet;

a second-image obtaining unit configured to obtain the second image;

a first registration unit configured to determine a first registration shift amount of the first image based on a difference in pixel values in a first reference area of the first image and the scanned image;

a second registration unit configured to determine a second registration shift amount of the second image based on a difference in pixel values of a second reference area of the second image and the scanned image;

a combining unit configured to generate a master image by relatively moving the first image and the second image based on the first registration shift amount and the second registration shift amount and combining the relatively moved version of the first image and the second image into the master image; and an inspection unit configured to inspect the printed matter by comparing the scanned image against the master image.

2. The image inspection apparatus according to claim 1, wherein the first registration unit extracts multiple first reference points from the first image and extracts, as the first reference area, an image in a predetermined area containing any one of the multiple first reference points, the second registration unit extracts multiple second reference points from the second image and extracts, as the second reference area, an image in a predetermined area containing any one of the multiple second reference points, and the inspection unit inspects the printed matter by comparing between the scanned image against and the master image on a per-pixel basis with reference to any one of a set of the multiple first reference points and a set of the multiple second reference points.

3. The image inspection apparatus according to claim 1, wherein the first registration unit performs the registration between the first image and the scanned image by extracting, from the first image, multiple first reference images, each of the multiple first reference images being in a different one of multiple predetermined areas and containing a first reference point, and performing, on each of the first reference images, registration between the first reference image and an image contained in the scanned image and matching with the first reference area, the second registration unit performs the registration between the second image and the scanned image by extracting, from the second image, multiple second reference images, each of the multiple second reference images being in a different one of multiple predetermined areas and containing a second reference point, and performing, on each of the second reference images, registration between the second reference image and an image contained in the scanned image and matching with the second reference area, and the combining unit performs the registration between the first image and the second image after applying geometry correction to the first image based on a result of the registration performed by the first registration unit and applying geometry correction to the second image based on a result of the registration performed by the second registration unit.

4. The image inspection apparatus according to claim 1, wherein the combining unit generates the master image by combining pixels, each of the pixels being one of multiple pixels making up the second image and belonging to pixels to which developer is to be applied, with the first image.

5. The image inspection apparatus according to claim 1, further comprising a correction unit configured to correct pixel values of pixels, each of the pixels being one of multiple pixels making up the first image and belonging to a no-image portion at which developer is not to be applied, to a first predetermined value.

6. The image inspection apparatus according to claim 1, further comprising a correction unit configured to correct pixel values of pixels, each of the pixels being one of multiple pixels making up the first image and belonging to an out-of-predetermined-image portion, the out-of-predetermined-image portion not making up the predetermined image, to a second predetermined value.

7. An image forming system comprising:

an image forming unit configured to produce a printed matter by forming a second image additionally on a sheet on which a predetermined image has been printed in advance;

an image scanning unit configured to generate a first image by scanning the sheet and generate a scanned image by scanning the printed matter;

an image obtaining unit configured to obtain the second image;

a first registration unit configured to determine a first registration shift amount of the first image based on a difference in pixel values in a first reference area of the first image and the scanned image;

a second registration unit configured to determine a second registration shift amount of the second image based on a difference in pixel values of a second reference area of the second image and the scanned image;

a combining unit configured to generate a master image by relatively moving the first image and the second image based on the first registration shift amount and the second registration shift amount and combining the relative moved version of first image and the second image into the master image; and an inspection unit configured to inspect the printed matter by comparing the scanned image against the master image.

8. An image inspection method comprising:

obtaining a first image generated by scanning a sheet on which a predetermined image has been printed in advance;

obtaining a scanned image generated by scanning a printed matter produced by printing a second image additionally on the sheet;

obtaining the second image;

determining a first registration shift amount of the first image based on a difference in pixel values in a first reference area of the first image and the scanned image;

determining a second registration shift amount of the second image based on a difference in pixel values of a second reference area of the second image and the scanned image;

generating a master image by relatively moving the first image and the second image based on the first registration shift amount and the second registration shift amount and combining the relatively moved version of first image and the second image into the master image; and inspecting the printed matter by comparing the scanned image against the master image.

* * * * *